United States Patent
Lee (10) Patent No.: US 9,247,102 B2
(45) Date of Patent: Jan. 26, 2016

(54) FACSIMILE, METHOD OF CONTROLLING THE SAME AND IMAGE FORMING APPARATUS HAVING FACSIMILE FUNCTION

(71) Applicant: SAMSUNG ELECTRONICS CO., LTD., Suwon-si, Gyeonggi-do (KR)

(72) Inventor: Jeong Baek Lee, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/272,836

(22) Filed: May 8, 2014

(65) Prior Publication Data
US 2014/0333973 A1   Nov. 13, 2014

(30) Foreign Application Priority Data
May 8, 2013   (KR) ................. 10-2013-0051780

(51) Int. Cl.
H04N 1/327   (2006.01)

(52) U.S. Cl.
CPC ......... *H04N 1/3273* (2013.01); *H04N 1/32708* (2013.01)

(58) Field of Classification Search
CPC ............ H04N 1/0083; H04N 1/00095; H04N 2201/0093; H04M 3/14; H04M 1/82
USPC ................. 358/1.15, 1.13, 405; 709/239, 240
See application file for complete search history.

(56) References Cited

FOREIGN PATENT DOCUMENTS

| KR | 2000-0020847 |   | 4/2000 |   |
|----|--------------|---|--------|---|
| KR | 10-2006-0122183 |   | 11/2006 |   |
| KR | 1020060122183 | * | 11/2006 | ........... H04N 1/0083 |
| KR | 1020060122183 A | * | 11/2006 | ............... H04N 1/00 |

* cited by examiner

*Primary Examiner* — Jamares Q Washington
(74) *Attorney, Agent, or Firm* — Staas & Halsey LLP (57) ABSTRACT

A facsimile, a method of controlling the same, and an image forming apparatus having a facsimile function are provided. The facsimile includes a line terminal provided for connection with a line cord and connected with a first signal line, an external device terminal provided for connection with an external device and connected with a second signal line, a switching unit to perform switching between the first signal line and the second signal line, and a controller to determine a connection state between the line terminal and the line cord and a connection state between the external device terminal and the external device, and to, when the external device and the line cord are reversely connected respectively to the line terminal and the external device terminal, control the switching unit to interchange a path of the first signal line and a path of the second signal line.

24 Claims, 9 Drawing Sheets

FACSIMILE, METHOD OF CONTROLLING THE SAME AND IMAGE FORMING APPARATUS HAVING FACSIMILE FUNCTION

CROSS-REFERENCE TO RELATED APPLICATIONS

This application is related to, and claims the priority benefit of, Korean Patent Application No. 10-2013-0051780, filed on May 8, 2013 in the Korean Intellectual Property Office, the disclosure of which is incorporated herein by reference.

BACKGROUND

1. Field

Embodiments relate to a facsimile having a telephone line terminal provided for connection with a telephone line cord and an external device terminal provided for connection with an external device, a method of controlling the same, and an image forming apparatus having a facsimile function.

2. Description of the Related Art

A facsimile may be defined as a device that converts an image such as a picture, a letter or a graphic into an electrical signal and transmits the converted electrical signal over a communication line, and restores a received electrical signal into an original image. The facsimile may require use of a communication line for transmission and reception of electrical signals, which may be a public switched telephone line generally referred to as a telephone line.

A facsimile may have a telephone line terminal (hereinafter referred to as "line terminal") provided for connection with a telephone line cord (hereinafter referred to as a "line cord"), and an external device terminal provided for connection with an external device (for example, a telephone). The line cord connected to the line terminal enables facsimile data to be transmitted and received over the telephone line. The external device connected to the external device terminal enables a call to be made through the line cord, as in, for example, a telephone.

In order to conduct both the transmission and reception of the facsimile data and the call, it is necessary to correctly connect the line cord to the line terminal and the external device to the external device terminal, respectively. If an external device and line cord are reversely connected to the line terminal and the external device terminal, respectively, a facsimile function may respond to a call signal or the external device, or telephone, may respond to a facsimile signal to ring. Such a faulty operation may confuse the user.

SUMMARY

It is an aspect of an exemplary embodiment to provide a facsimile, a method of controlling the same and an image forming apparatus having a facsimile function, in which, when an external device and a line cord are reversely connected to a line terminal and an external device terminal, respectively, such a situation is sensed and switching is thus performed between signal lines connected respectively to the line terminal and the external device terminal to enable use of the external device connected to the line terminal and communication through the line cord connected to the external device terminal.

Additional aspects are set forth in part in the description which follows and, in part, will be obvious from the description, or may be learned by practice of the invention.

In accordance with an aspect of an exemplary embodiment, a facsimile includes a line terminal provided for connection with a line cord and connected with a first signal line, an external device terminal provided for connection with an external device and connected with a second signal line, a switching unit to perform switching between the first signal line and the second signal line, and a controller to determine a connection state between the line terminal and the line cord and a connection state between the external device terminal and the external device, and to, when the external device and the line cord are reversely connected respectively to the line terminal and the external device terminal, control the switching unit to interchange a path of the first signal line and a path of the second signal line to enable use of the external device connected to the line terminal and communication through the line cord connected to the external device terminal.

The facsimile may include a signal line voltage detection unit to detect a voltage on the first signal line and a voltage on the second signal line, wherein the controller may determine the connection state between the line terminal and the line cord and the connection state between the external device terminal and the external device based on the voltage on the first signal line and the voltage on the second signal line detected by the signal line voltage detection unit.

The controller may determine that the line cord has been connected to the line terminal, when the voltage on the first signal line has a predetermined reference voltage level, that the external device has been connected to the line terminal, when the voltage on the first signal line does not have the predetermined reference voltage level, that the external device has been connected to the external device terminal, when the voltage on the second signal line does not have the predetermined reference voltage level, and that the line cord has been connected to the external device terminal, when the voltage on the second signal line has the predetermined reference voltage level.

The reference voltage level may be a level of a voltage supplied from a telephone line exchange through the line cord.

The level of the voltage supplied from the telephone line exchange may be about 48V.

The facsimile may include a signal line voltage detection unit to detect any one of a voltage on the first signal line and a voltage on the second signal line, wherein the controller may determine the connection state between the line terminal and the line cord and the connection state between the external device terminal and the external device based on the one of the voltage on the first signal line and the voltage on the second signal line detected by the signal line voltage detection unit.

The controller may determine that the line cord has been connected to the line terminal and the external device has been connected to the external device terminal, when the voltage on the first signal line has a predetermined reference voltage level, and that the external device has been connected to the line terminal and the line cord has been connected to the external device terminal, when the voltage on the first signal line does not have the predetermined reference voltage level.

The reference voltage level may be a level of a voltage supplied from a telephone line exchange through the line cord.

The level of the voltage supplied from the telephone line exchange may be about 48V.

The switching unit may include a first switch having a first contact connected to the first signal line, the first signal line extending from the line terminal, and a second contact connected to the second signal line, the second signal line extending from the external device terminal, the first switch performing switching between the first contact and the second contact, and a second switch having a third contact connected to the first signal line extending from the line terminal, and a fourth contact connected to the second signal line extending from the external device terminal, the second switch performing switching between the third contact thereof and the fourth contact thereof, wherein the first switch and the second switch may share a common line with each other.

The first switch may turn on the second contact thereof in a default state, and the second switch may turn on the third contact thereof in the default state.

The controller may, upon determining that the external device has been connected to the line terminal and the line cord has been connected to the external device terminal, re-set the default state such that the first switch turns on the first contact thereof in the default state and the second switch turns on the fourth contact thereof in the default state.

The controller may switch the first switch and the second switch to a state opposite to the default state for transmission/reception of facsimile data and return the first switch and the second switch to the default state when the transmission/reception of the facsimile data is completed.

In accordance with an aspect of an exemplary embodiment, a method of controlling a facsimile, which includes a line terminal provided for connection with a line cord and connected with a first signal line, an external device terminal provided for connection with an external device and connected with a second signal line, and a switching unit to perform switching between the first signal line and the second signal line, includes determining a connection state between the line terminal and the line cord and a connection state between the external device terminal and the external device, and controlling, when the external device and the line cord are reversely connected respectively to the line terminal and the external device terminal, the switching unit to interchange a path of the first signal line and a path of the second signal line to enable use of the external device connected to the line terminal and communication through the line cord connected to the external device terminal.

The facsimile may include a signal line voltage detection unit to detect a voltage on the first signal line and a voltage on the second signal line, wherein the determining may include determining the connection state between the line terminal and the line cord and the connection state between the external device terminal and the external device based on the voltage on the first signal line and the voltage on the second signal line detected by the signal line voltage detection unit.

The determining may include determining that the line cord has been connected to the line terminal, when the voltage on the first signal line has a predetermined reference voltage level, determining that the external device has been connected to the line terminal, when the voltage on the first signal line does not have the predetermined reference voltage level, determining that the external device has been connected to the external device terminal, when the voltage on the second signal line does not have the predetermined reference voltage level, and determining that the line cord has been connected to the external device terminal, when the voltage on the second signal line has the predetermined reference voltage level.

The reference voltage level may be a level of a voltage supplied from a telephone line exchange through the line cord.

The level of the voltage supplied from the telephone line exchange may be about 48V.

The facsimile may include a signal line voltage detection unit to detect any one of a voltage on the first signal line and a voltage on the second signal line, wherein the determining may include determining the connection state between the line terminal and the line cord and the connection state between the external device terminal and the external device based on the one of the voltage on the first signal line and the voltage on the second signal line detected by the signal line voltage detection unit.

The determining may include determining that the line cord has been connected to the line terminal and the external device has been connected to the external device terminal, when the voltage on the first signal line has a predetermined reference voltage level, and determining that the external device has been connected to the line terminal and the line cord has been connected to the external device terminal, when the voltage on the first signal line does not have the predetermined reference voltage level.

The reference voltage level may be a level of a voltage supplied from a telephone line exchange through the line cord.

The level of the voltage supplied from the telephone line exchange may be about 48V.

In accordance with an aspect of an exemplary embodiment, an image forming apparatus with a facsimile function includes a line terminal provided for connection with a line cord and connected with a first signal line, an external device terminal provided for connection with an external device and connected with a second signal line, a switching unit to perform switching between the first signal line and the second signal line, and a controller to determine a connection state between the line terminal and the line cord and a connection state between the external device terminal and the external device, and to, when the external device and the line cord are reversely connected respectively to the line terminal and the external device terminal, control the switching unit to interchange a path of the first signal line and a path of the second signal line to enable use of the external device connected to the line terminal and communication through the line cord connected to the external device terminal.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
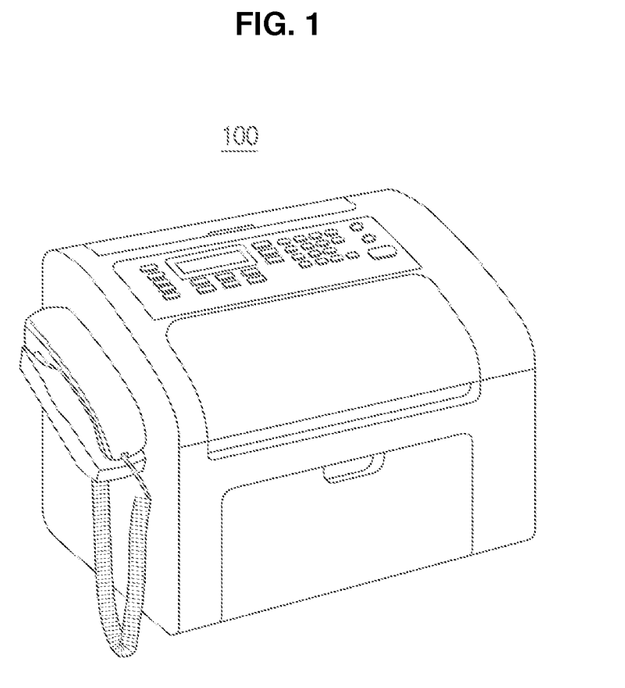
FIG. 1 illustrates a facsimile according to an embodiment.

FIG. 1 illustrates a facsimile according to an embodiment. An embodiment may be applied to a multifunction printer having a facsimile function, as well as a facsimile 100 as illustrated in FIG. 1. The facsimile 100 as illustrated in FIG. 1 or the facsimile function of the multifunction printer converts an image such as a picture, a letter or a graphic into an electrical signal and transmits the converted electrical signal over a communication line, and restores a received electrical signal into an original image. In this manner, the facsimile or facsimile function may use a communication line for transmission and reception of electrical signals, which may be a public switched telephone line generally referred to as a telephone line.

Figure 2A:
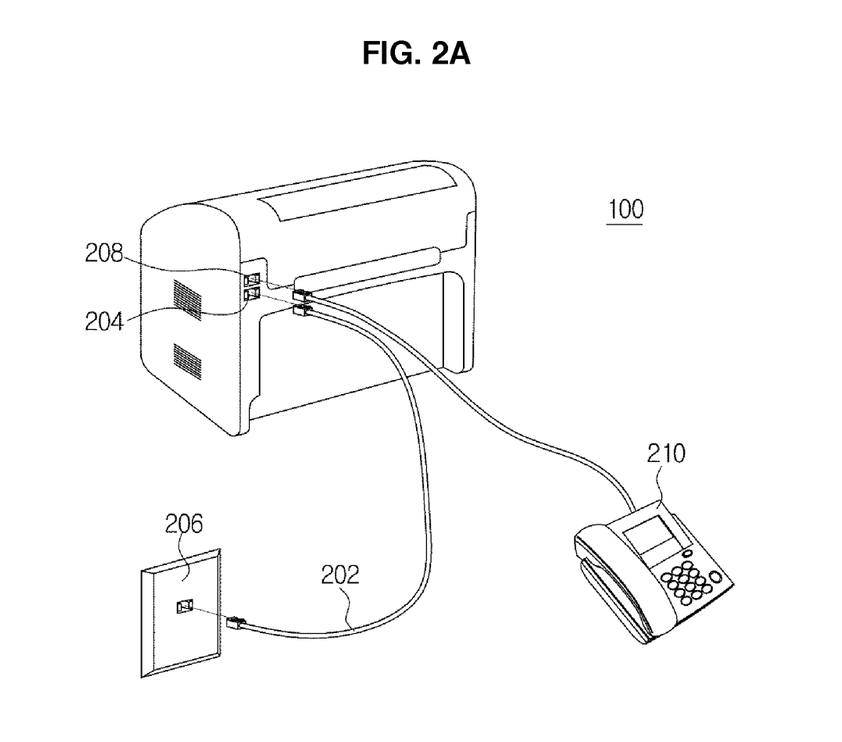
FIGS. 2A-2B illustrate an exemplary communication connection state of a facsimile.
Figure 2B:
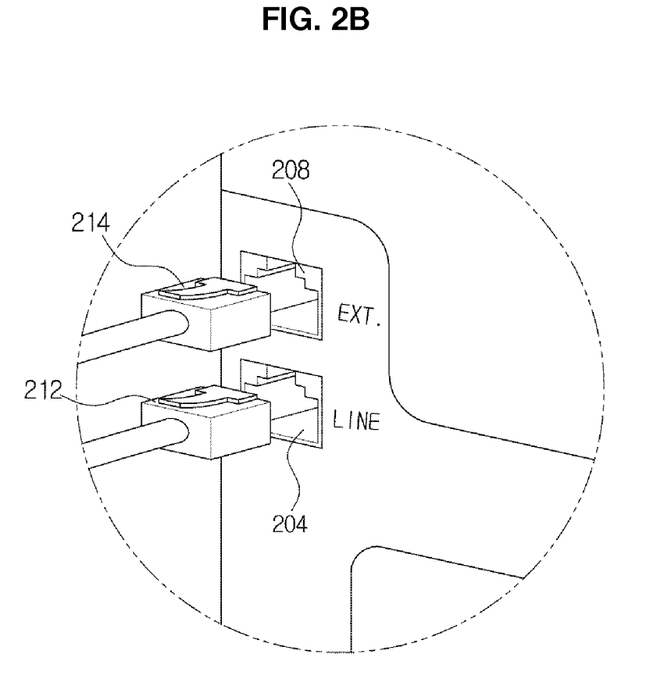

FIGS. 2A-2B illustrate an exemplary communication connection state of a facsimile. In a case where the facsimile 100 uses a telephone line as the communication line, a line cord 202 may be connected between a line terminal 204 of the facsimile 100 and a socket (e.g., a socket of a telephone network) 206 on a wall, as illustrated in FIG. 2A, such that the facsimile 100 performs communication over the telephone line. An external device, such as a telephone 210, may be connected to an external device terminal 208 of the facsimile 100. That is, a line jack 212 of the line cord 202 may be inserted into the line terminal 204 of the facsimile 100, and an external device jack 214 of the telephone 210 may be inserted into the external device terminal 208 of the facsimile 100, as illustrated in FIG. 2B. A mark indicating where the telephone line should be connected, such as "LINE", may be provided at the line terminal 204 of the facsimile 100, and a mark indicating where the external device such as the telephone 210 should be connected, such as "EXT.", may provided at the external device terminal 208 of the facsimile 100. However, a user may misunderstand or incorrectly recognize such guide marks, thereby inserting the external device jack 214 of the telephone 210 into the line terminal 204 of the facsimile 100 and inserting the line jack 212 of the line cord 202 into the external device terminal 208 of the facsimile 100.

Figure 3:
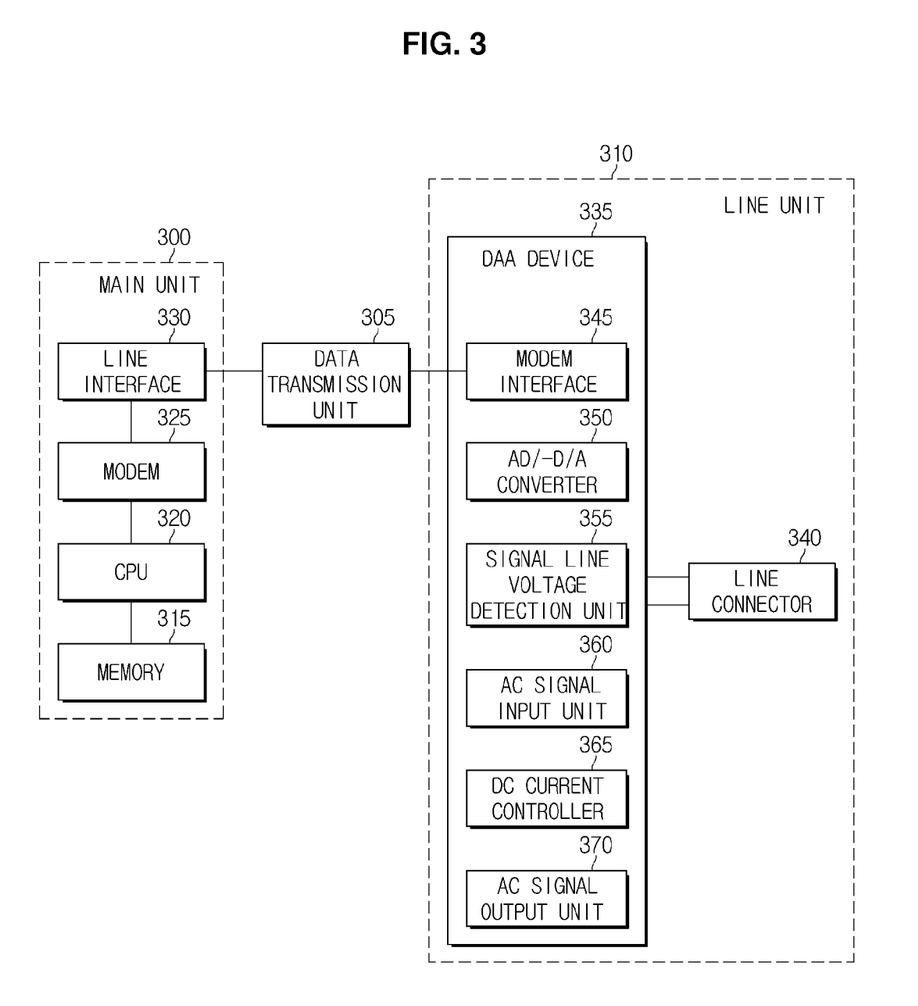
FIG. 3 illustrates a control system of a facsimile according to an embodiment.

FIG. 3 illustrates a control system of the facsimile according to an embodiment. The control system of the facsimile 100 according to an embodiment includes a main unit 300, a data transmission unit 305, and a line unit 310, as illustrated in FIG. 3.

The main unit 300 includes a memory 315, a controller (for example, a central processing unit (CPU)) 320, a modem 325, and a line interface 330. The line unit 310 includes a data access arrangement (DAA) device 335 and a line connector 340. The DAA device 335 includes a modem interface 345, an analog/digital-digital/analog (A/D-D/A) converter 350, a signal line voltage detection unit 355, an alternating current (AC) signal input unit 360, a direct current (DC) current controller 365, and an AC signal output unit 370.

The operation of the facsimile 100 is described in terms of facsimile data reception. An AC signal from a telephone network, for example, may be input to the AC signal input unit 360 through the line connector 340. The signal may be converted into a digital signal by the A/D-D/A converter 350.

The converted digital signal may be re-converted into a data signal of a format, e.g., a predetermined format through the modem interface 345. The data transmission unit 305 transmits the converted data signal, a clock signal, etc. to the main unit 300. The transmitted signals may be converted into a signal of a format, e.g., a predetermined format by the line interface 330 of the main unit 300. The signal may be transferred to the modem 325. The modem 325 extracts data from the signal transferred from the line interface 330. The extracted data may be stored in the memory 315 through the controller 320. The data stored in the memory 315 may be printed on recording paper.

The DC current controller 365 allows constant DC current to flow to the telephone network. The AC signal output unit 370 amplifies an output AC signal and sends the amplified AC signal to the telephone network. The signal line voltage detection unit 355 detects a voltage at the line terminal 204 and a voltage at the external device terminal 208 and transfers the voltage detection results to the controller 320. The controller 320 determines a line connection state based on the voltage detection results. Determining the line connection state may be a determining whether the line jack 212 of the line cord 202 has been inserted into the line terminal 204 of the facsimile 100 and/or a determining whether the external device jack 214 of the telephone 210 has been inserted into the external device terminal 208 of the facsimile 100. In general, an exchange of the telephone network supplies a DC voltage, for example, of 48V over the telephone line. When the line cord 202 is connected, the DC voltage of 48V may be detected at a corresponding terminal. The controller 320 may determine which one of the line cord 202 and the external device (telephone 210) has been connected, based on which one of the DC voltage of 48V and a DC voltage of 0V is detected at the line terminal 204 or the external device terminal 208. Provided that the DC voltage of 48V is detected at any one terminal, the controller 320 may determine that the line cord 202 has been connected to that terminal. Conversely, in a case where the DC voltage of 0V is detected at any one terminal, the controller 320 may determine that a line other than the line cord 202 (for example, a cable of the telephone) has been connected to that line.

Figure 4:
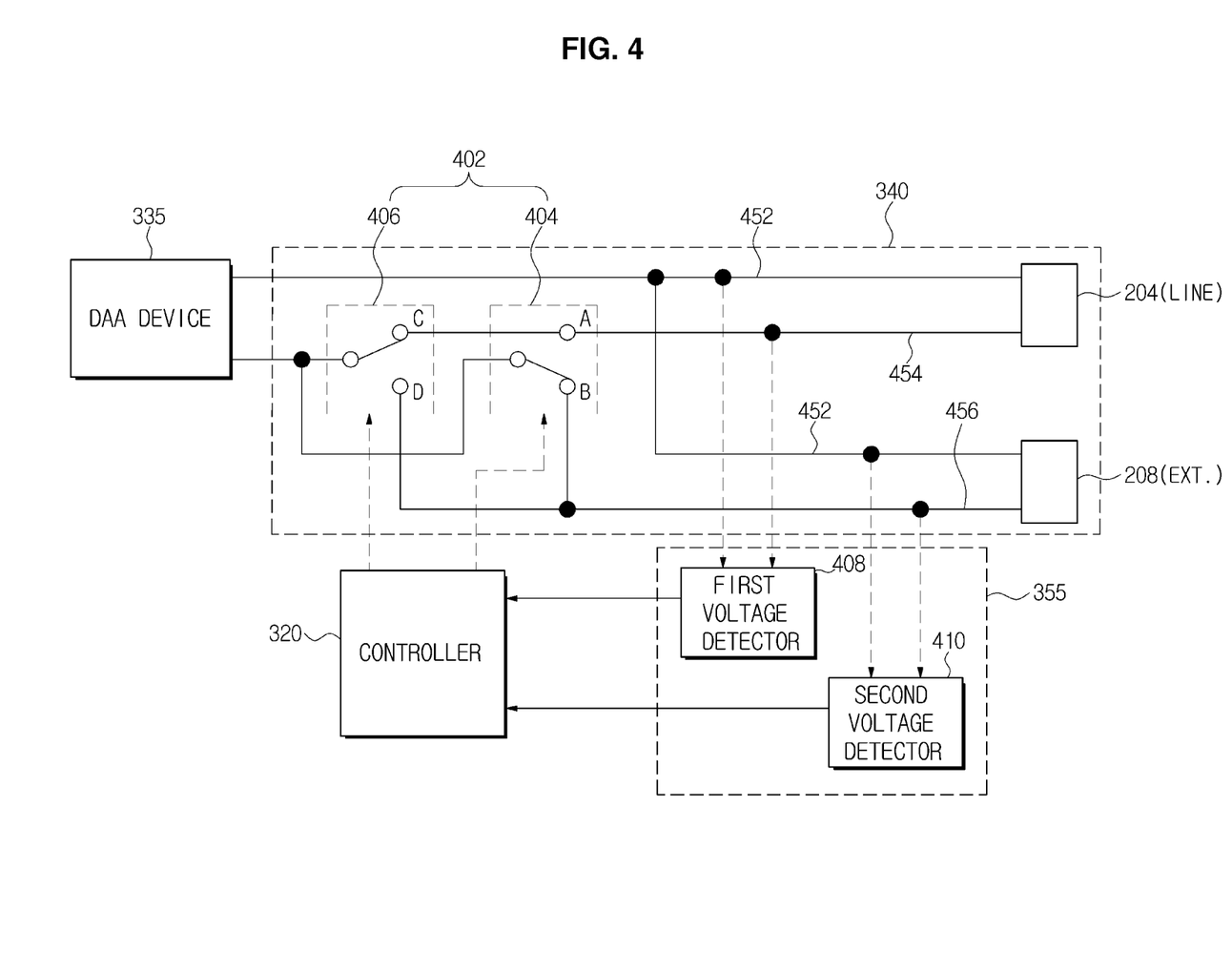
FIG. 4 is a circuit diagram of an embodiment of a line connector of a facsimile according to the embodiment.

FIG. 4 is a circuit diagram of an embodiment of the line connector of the facsimile according to an embodiment. As illustrated in FIG. 4, the line connector 340 includes a line terminal 204 and external device terminal 208 described previously with reference to FIG. 2, and a first switch 404 and a second switch 406 to electrically connect any one of the line terminal 204 and external device terminal 208 to the DAA device 335. The first switch 404 and the second switch 406 are a switching unit 402. Switching of each of the first switch 404 and second switch 406 may be controlled by the controller 320. The line terminal 204 and the external device terminal 208 may share a common line 452 with each other, and may be electrically connected to the DAA device 335, respectively, through a first signal line 454 (connected to the line terminal 204) and a second signal line 456 (connected to the external device terminal 208). The first switch 404 and the second switch 406 may be provided between the first signal line 454 and the second signal line 456. The first switch 404 has a contact A connected to the first signal line 454, which extends from the line terminal 204, and a contact B connected to the second signal line 456, which extends from the external device terminal 208. The first switch 404 performs switching between the contact A and the contact B to connect any one of the contact A and contact B to the DAA device 335. The second switch 406 has a contact C connected to the first signal line 454 extending from the line terminal 204, and a contact D connected to the second signal line 456 extending from the external device terminal 208. The second switch 406 performs switching between the contact C thereof and the contact D thereof to connect any one of the contact C and contact D thereof to the DAA device 335. In a default state, the first switch 404 turns on the contact B thereof to connect it to the DAA device 335, and the second switch 406 turns on the contact C thereof to connect it to the DAA device 335. In this default state, the line terminal 204 and the external device terminal 208 are both connected to the DAA device 335, respectively, through the first signal line 454 and the second signal line 456, so that transmission/reception of facsimile data through the line terminal 204 and use of the telephone 210 through the external device terminal 208 are both possible. The controller 320 determines the line connection state based on the signal line voltage detection results from the signal line voltage detection unit 355 (See. for example, the description of FIG. 3) and changes a switching state of the first switch 404 and second switch 406 based on a result of the line connection state determination. Under this switching state change control of the controller 320, any one of the line terminal 204 and external device terminal 208 may be electrically connected to the DAA device 335. The signal line voltage detection unit 355 includes a first voltage detector 408 and a second voltage detector 410. The first voltage detector 408 detects a voltage between the common line 452 and the first signal line 454 and provides the detection result to the controller 320. The second voltage detector 410 detects a voltage between the common line 452 and the second signal line 456 and provides the detection result to the controller 320. For detection of the voltage between the common line 452 and the first signal line 454 (also referred to as a "voltage on the first signal line 454"), the controller 320 switches both the first switch 404 and second switch 406 to the contacts A and C thereof to transfer a signal to the DAA device 335 only over the first signal line 454. For detection of the voltage between the common line 452 and the second signal line 456 (also referred to as a "voltage on the second signal line 456"), the controller 320 switches both the first switch 404 and second switch 406 to the contacts B and D thereof to transfer a signal to the DAA device 335 only over the second signal line 456.

Provided that an attempt to transmit/receive facsimile data through the line terminal 204 is made under the condition that the line cord 202 is normally connected to the line terminal 204 and the telephone 210 is normally connected to the external device terminal 208, the controller 320 assigns a communication priority to the transmission/reception of the facsimile data through the line terminal 204 by switching the first switch 404 from the contact B thereof to the contact A thereof while maintaining the second switch 406 in the default state in which the second switch 406 is switched to the contact C thereof. As a result, the transmission/reception of the facsimile data can be smoothly performed. When the transmission/reception of the facsimile data is completed, the controller 320 returns the first switch 404 to the contact B thereof such that the first switch 404 enters the default state. Even if the line jack 212 of the line cord 202, which should be inserted into the line terminal 204 of the facsimile 100, is incorrectly inserted into the external device terminal 208 of the facsimile 100 or the external device jack 214 of the telephone 210, which should be inserted into the external device terminal 208, is incorrectly inserted into the line terminal 204, the controller 320 enables both the correct transmission/reception of facsimile data through the line cord 202 and the correct call through the external device (telephone 210) by changing the switching state of the first switch 404 and second switch 406 based on the line connection state determination result.

Figure 5:
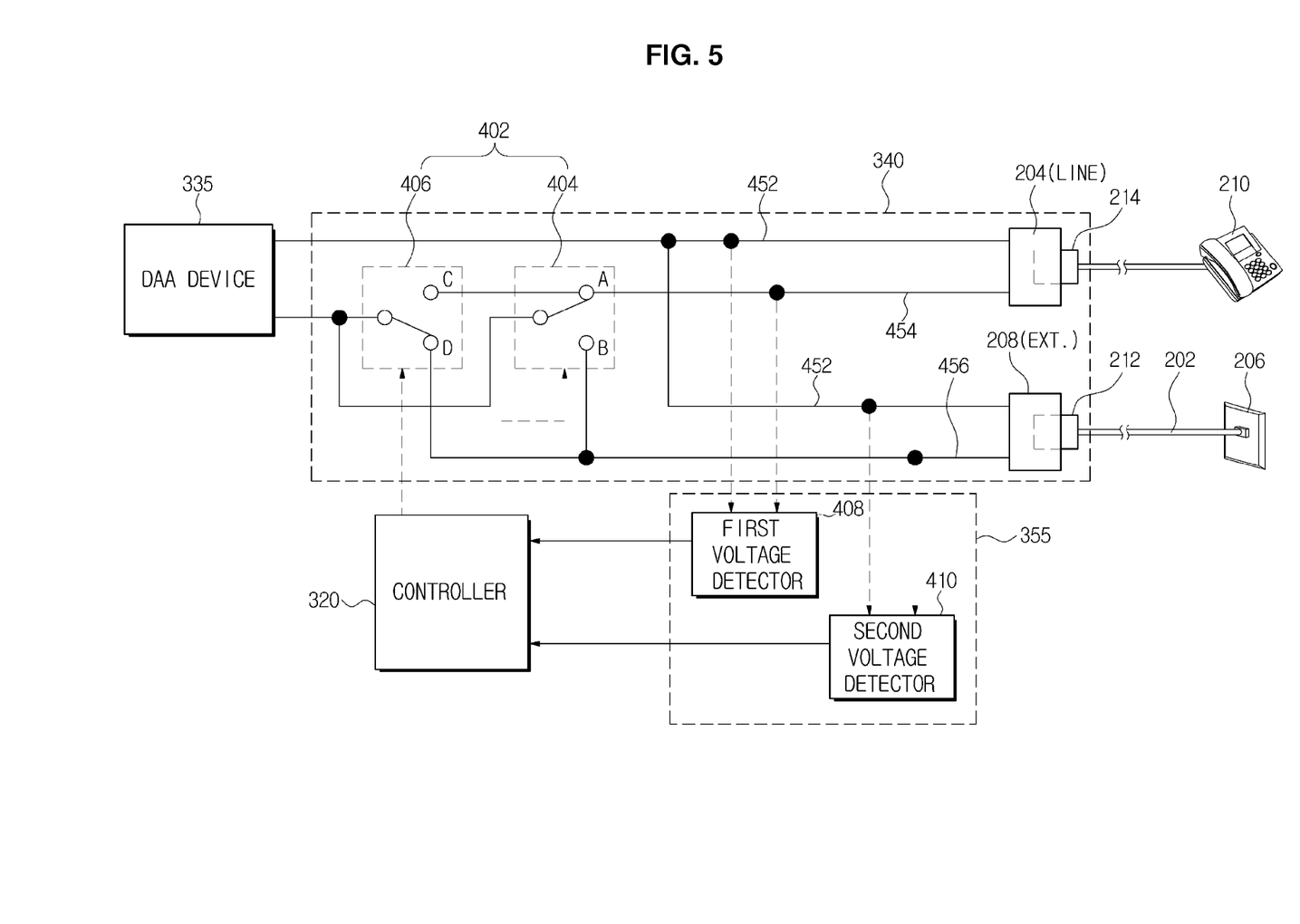
FIG. 5 is a circuit diagram illustrating an exemplary case in which a telephone line and an external device are incorrectly reversely connected to a line connector

FIG. 5 is a circuit diagram illustrating a case in which the telephone line and the external device are incorrectly reversely connected to a line connector. In a correct case, the line cord 202 should be connected to the line terminal 204 and the external device (telephone 210) should be connected to the external device terminal 208. However, if the external device (telephone 210) is incorrectly connected to the line terminal 204 and the line cord 202 is incorrectly connected to the external device terminal 208, as illustrated in FIG. 5, it may be impossible to normally conduct transmission/reception of facsimile data and use of the telephone 210 through the switching state of the case illustrated in FIG. 4. In a case where the external device (telephone 210) is incorrectly connected to the line terminal 204 and the line cord 202 is incorrectly connected to the external device terminal 208, as illustrated in FIG. 5, the controller 320 recognizes that the external device (telephone 210) has been incorrectly connected to the line terminal 204 and the line cord 202 has been incorrectly connected to the external device terminal 208, for example, through detection of the DC voltage, for example, of 0V at the line terminal 204 and detection of the DC voltage, for example, of 48V at the external device terminal 208. Although the external device (telephone 210) has been incorrectly connected to the line terminal 204 and the line cord 202 has been incorrectly connected to the external device terminal 208, the controller 320 enables both the correct transmission/reception of facsimile data through the telephone line and the correct call through the external device (telephone 210) by changing the switching state of the first switch 404 and second switch 406. The controller 320 switches the first switch 404 from the contact B thereof to the contact A thereof and switches the second switch 406 from the contact C thereof to the contact D thereof. As a result, the first signal line 454 to the line terminal 204 and the second signal line 456 to the external device terminal 208 are both connected to the DAA device 335 by the switching of the first switch 404 and second switch 406, so that both communication through the line terminal 204 and communication through the external device terminal 208 are enabled. The controller 320 re-sets the switching state of the first switch 404 and second switch 406 resulting from the incorrect connections of the line cord 202 and external device (telephone 210) to the line terminal 204 and external device terminal 208 to the default state. That is, in the default state of the correct case, the first switch 404 is switched to the contact B thereof and the second switch 406 is switched to the contact C thereof, as disclosed with reference to FIG. 4. However, in a case where the line cord 202 and the external device (telephone 210) are incorrectly connected to the line terminal 204 and the external device terminal 208, as illustrated in FIG. 5, the first switch 404 is switched to the contact A thereof and the second switch 406 is switched to the contact D thereof, and this switching state is then re-set to the default state. Therefore, it is possible to continuously maintain the switching state of the first switch 404 and second switch 406 for correction of the incorrect connections to the line terminal 204 and external device terminal 208.

Provided that an attempt to transmit/receive facsimile data over the telephone line is made in this state, the controller 320 switches the first switch 404 from the contact A thereof to the contact B thereof to assign a communication priority to the second signal line 456 to the external device terminal 208 to which the line cord 202 is connected, thereby enabling the transmission/reception of the facsimile data through the second signal line 456, the external device terminal 208 and the line cord 202. When the transmission/reception of the facsimile data is completed, the controller 320 returns the first switch 404 from the contact B thereof to the contact A thereof to withdraw the communication priority assigned to the external device terminal 208, thereby enabling both communication through the line terminal 204 and communication through the external device terminal 208.

Figure 6:
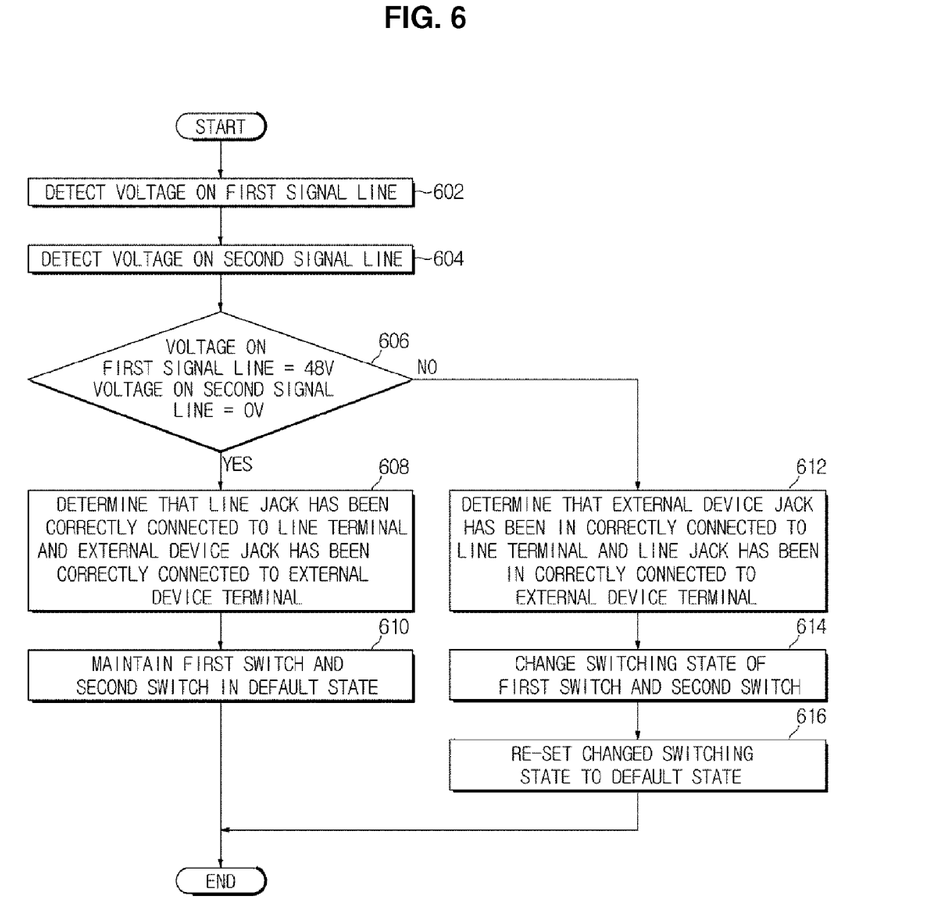
FIG. 6 is a flowchart illustrating a method of controlling a facsimile according to an embodiment.

FIG. 6 is a flowchart illustrating a method of controlling the facsimile according to an embodiment. The control method of FIG. 6 may be performed by the controller 320 in the facsimile 100 illustrated, for example, in FIGS. 1 to 5. As illustrated in FIG. 6, first, the first voltage detector 408 detects a voltage on the first signal line 454 (operation 602) and the second voltage detector 410 detects a voltage on the second signal line 456 (operation 604). The first voltage detector 408 and the second voltage detector 410 provide the voltage detection results to the controller 320. The controller 320 determines what has been connected to each of the line terminal 204 and the external device terminal 208, from the voltage on the first signal line 454 and the voltage on the second signal line 456 (operation 606).

In a case where the voltage on the first signal line 454 connected to the line terminal 204 is 48V, for example, and the voltage on the second signal line 456 connected to the external device terminal 208 is 0V, for example, ("YES" of operation 606), the controller 320 determines that the line jack 212 has been correctly connected to the line terminal 204 and the external device jack 214 has been correctly connected to the external device terminal 208 (operation 608). In this exemplary case, in order to maintain the correct connection between the line jack 212 and the line terminal 204 and the correct connection between the external device jack 214 and the external device terminal 208, the controller 320 maintains the first switch 404 and the second switch 406 in the default state as illustrated, for example, in FIG. 4 (operation 610).

When the voltage on the first signal line 454 connected to the line terminal 204 is 0V and the voltage on the second signal line 456 connected to the external device terminal 208 is 48V ("NO" of operation 606), the controller 320 determines that the external device jack 214 has been incorrectly connected to the line terminal 204 and the line jack 212 has been incorrectly connected to the external device terminal 208 (operation 612). In this case, in order to correct the incorrect connection between the external device jack 214 and the line terminal 204 and the incorrect connection between the line jack 212 and the external device terminal 208, the controller 320 changes the switching state of the first switch 404 and second switch 406 as illustrated in FIG. 5 (operation 614). As disclosed with reference to FIG. 5, changing the switching state as illustrated in FIG. 5 enables use of the external device (telephone 210) through the external device jack 214 incorrectly connected to the line terminal 204 and transmission/reception of facsimile data through the line jack 212 incorrectly connected to the external device terminal 208. The controller 320 re-sets the changed switching state of the first switch 404 and second switch 406 for correction of the incorrect connection between the external device jack 214 and the line terminal 204 and the incorrect connection between the line jack 212 and the external device terminal 208 to the default state, so as to continuously maintain the correct transmission/reception of the facsimile data and the correct use of the external device (telephone 210) (operation 616).

Figure 7:
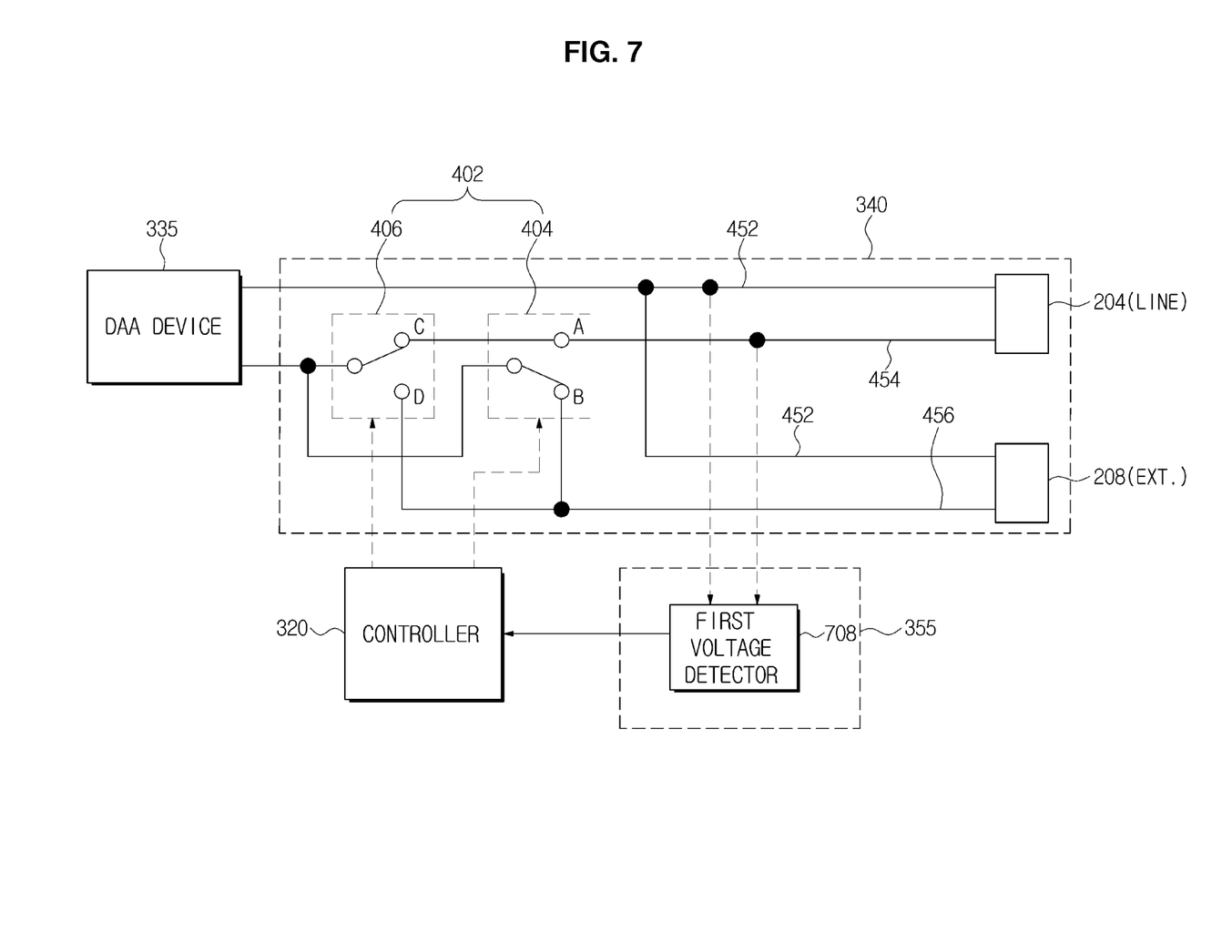
FIG. 7 is a circuit diagram of an embodiment of a line connector of a facsimile according to an embodiment.

FIG. 7 is a circuit diagram of an embodiment of the line connector of the facsimile according to an embodiment. As illustrated in FIG. 7, the line connector 340 includes the line terminal 204 and external device terminal 208, described with reference to FIG. 2, and a first switch 404 and a second switch 406 to electrically connect any one of the line terminal 204 and external device terminal 208 to the DAA device 335. The first switch 404 and the second switch 406 are a switching unit 402. Switching of each of the first switch 404 and second switch 406 may be controlled by the controller 320. The line terminal 204 and the external device terminal 208 share a common line 452 with each other, and are electrically connected to the DAA device 335, respectively, through a first signal line 454 (connected to the line terminal 204) and a second signal line 456 (connected to the external device terminal 208). The first switch 404 and the second switch 406 are provided between the first signal line 454 and the second signal line 456. The first switch 404 has a contact A connected to the first signal line 454, which extends from the line terminal 204, and a contact B connected to the second signal line 456, which extends from the external device terminal 208. The first switch 404 performs switching between the contact A and the contact B to connect any one of the contact A and contact B to the DAA device 335. The second switch 406 has a contact C connected to the first signal line 454 extending from the line terminal 204, and a contact D connected to the second signal line 456 extending from the external device terminal 208. The second switch 406 performs switching between the contact C thereof and the contact D thereof to connect any one of the contact c and contact D thereof to the DAA device 335. In a default state, the first switch 404 turns on the contact B thereof to connect it to the DAA device 335, and the second switch 406 turns on the contact C thereof to connect it to the DAA device 335. In this default state, the line terminal 204 and the external device terminal 208 are both connected to the DAA device 335, respectively, through the first signal line 454 and the second signal line 456, so that transmission/reception of facsimile data through the line terminal 204 and use of the telephone 210 through the external device terminal 208 are both possible. The controller 320 determines the line connection state based on the signal line voltage detection results from the signal line voltage detection unit 355 (See, for example, the description of FIG. 3) and changes a switching state of the first switch 404 and second switch 406 based on a result of the line connection state determination. Under this switching state change control of the controller 320, any one of the line terminal 204 and external device terminal 208 may be electrically connected to the DAA device 335. The signal line voltage detection unit 355 includes only one first voltage detector 708. The first voltage detector 708 detects a voltage between the common line 452 and the first signal line 454 and provides the detection result to the controller 320. The first voltage detector 708 may detect a voltage between the common line 452 and the second signal line 456. For detection of the voltage between the common line 452 and the first signal line 454 (also referred to as a "voltage on the first signal line 454"), the controller 320 switches both the first switch 404 to contact A and second switch 406 to the contact C thereof to transfer a signal to the DAA device 335 only over the first signal line 454. Because the signal line voltage detection unit 355 includes only the one first voltage detector 708 as illustrated in FIG. 7, the second voltage detector 410 of FIG. 4 is not necessary, resulting in a reduction in the number of parts, a reduction in the length of a manufacturing process, a reduction in the size of a product, etc., thereby considerably contributing to curtailment of manufacturing costs and miniaturization of the product. There may be a low probability that lines other than the line cord 202 and the external device (telephone 210) will be inserted into the line terminal 204 and the external device terminal 208. In this regard, the controller 320 indirectly determines what has been connected to each of the line terminal 204 and the external device terminal 208 by detecting only the voltage on the first signal line 454 through the first voltage detector 708 and estimating the voltage between the common line 452 and the second signal line 456 (also referred to as a "voltage on the second signal line 456") from the detected voltage on the first signal line 454. For example, it may be assumed with a high probability that any one of the line cord 202 and external device (telephone 210) and the other one are connected respectively to the line terminal 204 and the external device terminal 208. When the voltage of 48V is detected on the first signal line 454 connected to the line terminal 204, a voltage (i.e., 0V) other than 48V may be estimated to be detected on the second signal line 456 connected to the external device terminal 208. As a result, the controller 320 may determine that the line cord 202 has been connected to the line terminal 204 and the external device (telephone 210) has been connected to the external device terminal 208. When the voltage of 0V is detected on the first signal line 454 connected to the line terminal 204, a voltage (i.e., 48V) other than 0V may be estimated to be detected on the second signal line 456 connected to the external device terminal 208. As a result, the controller 320 may determine that the external device (telephone 210) has been connected to the line terminal 204 and the line cord 202 has been connected to the external device terminal 208. Based on these voltage detection results, the controller 320 may maintain the first switch 404 and the second switch 406 in the default state as illustrated in FIG. 7, or change the switching state of the first switch 404 and second switch 406 and then re-set the changed switching state to the default state.

Figure 8:
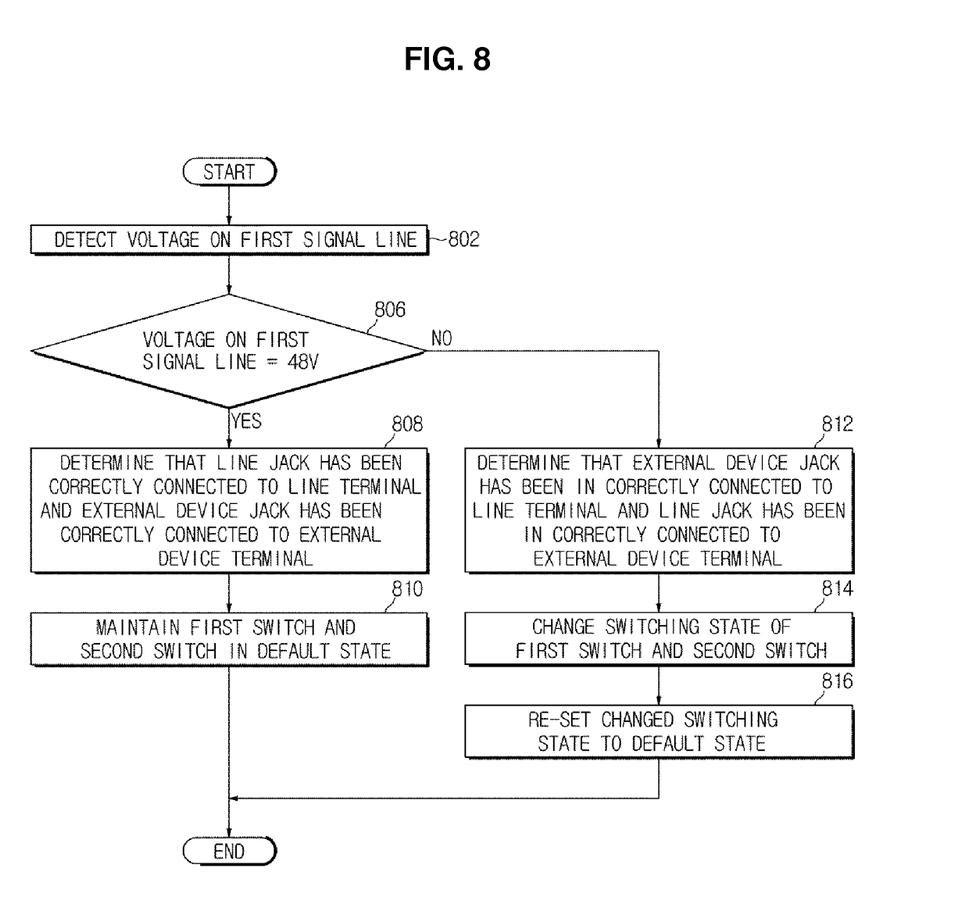
FIG. 8 is a flowchart illustrating a method of controlling a facsimile according to an embodiment.

FIG. 8 is a flowchart illustrating a method of controlling a facsimile according to an embodiment. The control method of FIG. 8 may be performed by the controller 320 in the facsimile 100 illustrated, for example, in FIGS. 1 to 3 and FIG. 7. As illustrated in FIG. 8, the first voltage detector 708 detects a voltage on the first signal line 454 (operation 802). The first voltage detector 708 provides the voltage detection result to the controller 320. The controller 320 determines what has been connected to each of the line terminal 204 and the external device terminal 208, from the voltage on the first signal line 454 (operation 806). That is, the controller 320 indirectly determines what has been connected to each of the line terminal 204 and the external device terminal 208 by detecting only the voltage on the first signal line 454 through the first voltage detector 708 and estimating the voltage on the second signal line 456 from the detected voltage on the first signal line 454 (See, for example, the description of FIG. 7).

In a case where the voltage on the first signal line 454 connected to the line terminal 204 is 48V ("YES" of operation 806), the controller 320 determines that the line jack 212 has been normally connected to the line terminal 204 and the external device jack 214 has been normally connected to the external device terminal 208 (operation 808). In this case, in order to maintain the correct connection between the line jack 212 and the line terminal 204 and the correct connection between the external device jack 214 and the external device terminal 208, the controller 320 maintains the first switch 404 and the second switch 406 in the default state as illustrated in FIG. 7 (operation 810).

Conversely, when the voltage on the first signal line 454 connected to the line terminal 204 is 0V ("NO" of 806), the controller 320 determines that the external device jack 214 has been incorrectly connected to the line terminal 204 and the line jack 212 has been incorrectly connected to the external device terminal 208 (812). In this case, in order to correct the incorrect connection between the external device jack 214 and the line terminal 204 and the incorrect connection between the line jack 212 and the external device terminal 208, the controller 320 changes the switching state of the first switch 404 and second switch 406 as illustrated in FIG. 5 (operation 814). As discussed with reference to FIG. 5, changing the switching state as illustrated in FIG. 5 enables use of the external device (telephone 210) through the external device jack 214 incorrectly connected to the line terminal 204 and transmission/reception of facsimile data through the line jack 212 incorrectly connected to the external device terminal 208. The controller 320 re-sets the changed switching state of the first switch 404 and second switch 406 for correction of the incorrect connection between the external device jack 214 and the line terminal 204 and the incorrect connection between the line jack 212 and the external device terminal 208 to the default state, thereby continuously maintaining the correct transmission/reception of the facsimile data and the correct use of the external device (telephone 210) (operation 816).

As is apparent from the above description, in a facsimile, a method of controlling the same and an image forming apparatus having a facsimile function according to an aspect of an embodiment, when an external device and a line cord are reversely connected to a line terminal and an external device terminal, respectively, such a situation may be sensed and switching is thus performed between signal lines connected respectively to the line terminal and the external device terminal to enable use of the external device connected to the line terminal and communication through the line cord connected to the external device terminal.

Although a few embodiments of the present invention have been shown and described, it would be appreciated by those skilled in the art that changes may be made in these embodiments without departing from the principles and spirit of the invention, the scope of which is defined in the claims and their equivalents

What is claimed is:

1. A facsimile comprising:
    a line terminal provided for connection with a line cord and connected with a first signal line;
    an external device terminal provided for connection with an external device and connected with a second signal line;
    a switching unit to perform switching between the first signal line and the second signal line; and
    a controller to determine a connection state between the line terminal and the line cord and a connection state between the external device terminal and the external device, and to, when the external device and the line cord are reversely connected respectively to the line terminal and the external device terminal, control the switching unit to interchange a path of the first signal line and a path of the second signal line to enable use of the external device connected to the line terminal and communication through the line cord connected to the external device terminal,
    wherein the switching unit comprises:
        a first switch having a first contact connected to the first signal line, the first signal line extending from the line terminal, and a second contact connected to the second signal line, the second signal line extending from the external device terminal, the first switch performing switching between the first contact and the second contact, and
        a second switch having a third contact connected to the first signal line extending from the line terminal, and a fourth contact connected to the second signal line extending from the external device terminal, the second switch performing switching between the third contact thereof and the fourth contact thereof,
    wherein the first switch and the second switch share a common line with each other.

2. The facsimile according to claim 1, further comprising a signal line voltage detection unit to detect a voltage on the first signal line and a voltage on the second signal line,
    wherein the controller determines the connection state between the line terminal and the line cord and the connection state between the external device terminal and the external device based on the voltage on the first signal line and the voltage on the second signal line detected by the signal line voltage detection unit.

3. The facsimile according to claim 2, wherein the controller determines:
that the line cord has been connected to the line terminal, when the voltage on the first signal line has a predetermined reference voltage level;
that the external device has been connected to the line terminal, when the voltage on the first signal line does not have the predetermined reference voltage level;
that the external device has been connected to the external device terminal, when the voltage on the second signal line does not have the predetermined reference voltage level; and
that the line cord has been connected to the external device terminal, when the voltage on the second signal line has the predetermined reference voltage level.

4. The facsimile according to claim 3, wherein the reference voltage level is a level of a voltage supplied from a telephone line exchange through the line cord.

5. The facsimile according to claim 4, wherein the level of the voltage supplied from the telephone line exchange is about 48V.

6. The facsimile according to claim 1, further comprising a signal line voltage detection unit to detect any one of a voltage on the first signal line and a voltage on the second signal line,
wherein the controller determines the connection state between the line terminal and the line cord and the connection state between the external device terminal and the external device based on the one of the voltage on the first signal line and the voltage on the second signal line detected by the signal line voltage detection unit.

7. The facsimile according to claim 6, wherein the controller determines:
that the line cord has been connected to the line terminal and the external device has been connected to the external device terminal, when the voltage on the first signal line has a predetermined reference voltage level; and
that the external device has been connected to the line terminal and the line cord has been connected to the external device terminal, when the voltage on the first signal line does not have the predetermined reference voltage level.

8. The facsimile according to claim 7, wherein the reference voltage level is a level of a voltage supplied from a telephone line exchange through the line cord.

9. The facsimile according to claim 8, wherein the level of the voltage supplied from the telephone line exchange is about 48V.

10. The facsimile according to claim 1, wherein:
the first switch turns on the second contact thereof in a default state; and
the second switch turns on the third contact thereof in the default state.

11. The facsimile according to claim 10, wherein the controller, upon determining that the external device has been connected to the line terminal and the line cord has been connected to the external device terminal, re-sets the default state such that the first switch turns on the first contact thereof in the default state and the second switch turns on the fourth contact thereof in the default state.

12. The facsimile according to claim 11, wherein the controller switches the first switch and the second switch to a state opposite to the default state for transmission/reception of facsimile data and returns the first switch and the second switch to the default state when the transmission/reception of the facsimile data is completed.

13. A method of controlling a facsimile, the facsimile comprising a line terminal provided for connection with a line cord and connected with a first signal line, an external device terminal provided for connection with an external device and connected with a second signal line, and a switching unit to perform switching between the first signal line and the second signal line, the method comprising:
determining a connection state between the line terminal and the line cord and a connection state between the external device terminal and the external device; and
controlling, when the external device and the line cord are reversely connected respectively to the line terminal and the external device terminal, the switching unit to interchange a path of the first signal line and a path of the second signal line to enable use of the external device connected to the line terminal and communication through the line cord connected to the external device terminal,
wherein a first switch having a first contact connected to the first signal line, the first signal line extending from the line terminal, and a second contact connected to the second signal line, the second signal line extending from the external device terminal, the first switch performing switching between the first contact and the second contact, and
a second switch having a third contact connected to the first signal line extending from the line terminal, and a fourth contact connected to the second signal line extending from the external device terminal, the second switch performing switching between the third contact thereof and the fourth contact thereof,
wherein the first switch and the second switch share a common line with each other.

14. The method according to claim 13, wherein the facsimile further comprises a signal line voltage detection unit to detect a voltage on the first signal line and a voltage on the second signal line,
wherein the determining comprises determining the connection state between the line terminal and the line cord and the connection state between the external device terminal and the external device based on the voltage on the first signal line and the voltage on the second signal line detected by the signal line voltage detection unit.

15. The method according to claim 14, wherein the determining comprises:
determining that the line cord has been connected to the line terminal, when the voltage on the first signal line has a predetermined reference voltage level;
determining that the external device has been connected to the line terminal, when the voltage on the first signal line does not have the predetermined reference voltage level;
determining that the external device has been connected to the external device terminal, when the voltage on the second signal line does not have the predetermined reference voltage level; and
determining that the line cord has been connected to the external device terminal, when the voltage on the second signal line has the predetermined reference voltage level.

16. The method according to claim 15, wherein the reference voltage level is a level of a voltage supplied from a telephone line exchange through the line cord.

17. The method according to claim 16, wherein the level of the voltage supplied from the telephone line exchange is about 48V.

18. The method according to claim 13, wherein the facsimile further comprises a signal line voltage detection unit to detect any one of a voltage on the first signal line and a voltage on the second signal line,
wherein the determining comprises determining the connection state between the line terminal and the line cord and the connection state between the external device terminal and the external device based on the one of the voltage on the first signal line and the voltage on the second signal line detected by the signal line voltage detection unit.

19. The method according to claim 18, wherein the determining comprises:
determining that the line cord has been connected to the line terminal and the external device has been connected to the external device terminal, when the voltage on the first signal line has a predetermined reference voltage level; and
determining that the external device has been connected to the line terminal and the line cord has been connected to the external device terminal, when the voltage on the first signal line does not have the predetermined reference voltage level.

20. The method according to claim 19, wherein the reference voltage level is a level of a voltage supplied from a telephone line exchange through the line cord.

21. The method according to claim 20, wherein the level of the voltage supplied from the telephone line exchange is about 48V.

22. An image forming apparatus with a facsimile function, comprising:
a line terminal provided for connection with a line cord and connected with a first signal line;
an external device terminal provided for connection with an external device and connected with a second signal line;
a switching unit to perform switching between the first signal line and the second signal line; and
a controller to determine a connection state between the line terminal and the line cord and a connection state between the external device terminal and the external device, and to, when the external device and the line cord are reversely connected respectively to the line terminal and the external device terminal, control the switching unit to interchange a path of the first signal line and a path of the second signal line to enable use of the external device connected to the line terminal and communication through the line cord connected to the external device terminal,
wherein the switching unit comprises:
a first switch having a first contact connected to the first signal line, the first signal line extending from the line terminal, and a second contact connected to the second signal line, the second signal line extending from the external device terminal, the first switch performing switching between the first contact and the second contact, and
a second switch having a third contact connected to the first signal line extending from the line terminal, and a fourth contact connected to the second signal line extending from the external device terminal, the second switch performing switching between the third contact thereof and the fourth contact thereof,
wherein the first switch and the second switch share a common line with each other.

23. An apparatus, comprising:
a first terminal provided for connection with a first device and connected with a first signal line;
a second terminal provided for connection with a second device and connected with a second signal line;
a switching unit to perform switching between the first signal line and the second signal line; and
a controller to determine a connection state between the first terminal and the first device and a connection state between the second terminal and the second device, and to, when the second device and the first device are reversely connected respectively to the first terminal and the second terminal, control the switching unit to interchange a path of the first signal line and a path of the second signal line to enable use of the second device connected to the first terminal and communication through the first device connected to the second terminal,
wherein the switching unit comprises:
a first switch having a first contact connected to the first signal line, the first signal line extending from the first terminal, and a second contact connected to the second signal line, the second signal line extending from the second terminal, the first switch performing switching between the first contact and the second contact, and
a second switch having a third contact connected to the first signal line extending from the first terminal, and a fourth contact connected to the second signal line extending from the second terminal, the second switch performing switching between the third contact thereof and the fourth contact thereof,
wherein the first switch and the second switch share a common line with each other.

24. A method of controlling a connection, the method comprising:
determining a connection state between a first terminal and a first device and a connection state between a second terminal and a second device; and
controlling, when the second device and the first device are reversely connected respectively to the first terminal and the second terminal, a switching unit to interchange a path of the first signal line and a path of the second signal line to enable use of the second device connected to the first terminal and communication through the first device connected to the second terminal,
wherein the switching unit comprises:
a first switch having a first contact connected to the first signal line, the first signal line extending from the first terminal, and a second contact connected to the second signal line, the second signal line extending from the second terminal, the first switch performing switching between the first contact and the second contact, and
a second switch having a third contact connected to the first signal line extending from the first terminal, and a fourth contact connected to the second signal line extending from the second terminal, the second switch performing switching between the third contact thereof and the fourth contact thereof,
wherein the first switch and the second switch share a common line with each other.

* * * * *